United States Patent
Wu (10) Patent No.: US 12,088,868 B2
(45) Date of Patent: Sep. 10, 2024

(54) TV AWAKENING METHOD BASED ON SPEECH RECOGNITION, SMART TV AND STORAGE MEDIUM

(71) Applicant: COOCAA NETWORK TECHNOLOGY CO., LTD., Guangdong (CN)

(72) Inventor: Jiang Wu, Shenzhen (CN)

(73) Assignee: COOCAA NETWORK TECHNOLOGY CO., LTD., Shenzhen (CN)

( * ) Notice: Subject to any disclaimer, the term of this patent is extended or adjusted under 35 U.S.C. 154(b) by 319 days.

(21) Appl. No.: 17/598,472

(22) PCT Filed: Sep. 5, 2019

(86) PCT No.: PCT/CN2019/104470
§ 371 (c)(1),
(2) Date: Sep. 27, 2021

(87) PCT Pub. No.: WO2020/192019
PCT Pub. Date: Oct. 1, 2020

(65) Prior Publication Data
US 2022/0191576 A1    Jun. 16, 2022

(30) Foreign Application Priority Data
Mar. 28, 2019 (CN) .......................... 201910242090.8

(51) Int. Cl.
*H04N 21/422* (2011.01)
*G10L 15/02* (2006.01)
(Continued)

(52) U.S. Cl.
CPC ....... *H04N 21/42203* (2013.01); *G10L 15/02* (2013.01); *G10L 15/22* (2013.01);
(Continued)

(58) Field of Classification Search
CPC ......... H04N 21/42203; H04N 21/4436; H04N 21/818; G10L 15/02; G10L 15/22; G10L 2015/223
See application file for complete search history.

(56) References Cited

U.S. PATENT DOCUMENTS

2005/0235319 A1* 10/2005 Carpenter .......... H04N 21/4622
348/E5.103
2014/0009609 A1    1/2014 Webster et al.
(Continued)

FOREIGN PATENT DOCUMENTS

| CN | 104333788 A | 2/2015 |
| CN | 109360567 A | 2/2019 |
| CN | 109714635 A | 5/2019 |

OTHER PUBLICATIONS

International Search Report issued on Dec. 30, 2019 in corresponding International Application No. PCT/CN2019/104470; 4 pages.

*Primary Examiner* — Jefferey F Harold
*Assistant Examiner* — Franklin S Andramuno
(74) *Attorney, Agent, or Firm* — Maier & Maier, PLLC (57) ABSTRACT

A TV awakening method based on speech recognition, smart TV and storage medium. By setting a standby state of the smart TV to the standby state of screen being off without powering off, the user's speech can be received and recognized in real time to wake up and control the smart TV, and speech recognition has been efficiently applied, smart turning-on and turning-off in real time are realized, and diversified requirements of the user are met.

14 Claims, 3 Drawing Sheets

(51) Int. Cl.
*G10L 15/22* (2006.01)
*H04N 21/443* (2011.01)
*H04N 21/81* (2011.01)

(52) U.S. Cl.
CPC ....... *H04N 21/4436* (2013.01); *H04N 21/818* (2013.01); *G10L 2015/223* (2013.01)

(56) References Cited

U.S. PATENT DOCUMENTS

| | | | | |
|---|---|---|---|---|
| 2016/0188189 A1* | 6/2016 | Chu | ................... | G06F 3/04886 |
| | | | | 715/779 |
| 2016/0353173 A1* | 12/2016 | Du | ................... | H04N 21/44008 |
| 2017/0111693 A1* | 4/2017 | Wang | ................. | H04N 21/4788 |
| 2019/0005953 A1* | 1/2019 | Bundalo | ................ | G06F 1/3287 |
| 2019/0378533 A1* | 12/2019 | Chao | ....................... | G10L 17/02 |

* cited by examiner

TV AWAKENING METHOD BASED ON SPEECH RECOGNITION, SMART TV AND STORAGE MEDIUM

CROSS-REFERENCE TO RELATED APPLICATIONS

This application is a national stage application of PCT Patent Application No. PCT/CN2019/104470, filed on Sep. 5, 2019, which claims priority to Chinese Patent Application No. 2019102420908, filed on Mar. 28, 2019, the content of all of which is incorporated herein by reference.

FIELD

The present disclosure relates to the technical field of smart TV, and more particularly, to a TV awakening method based on speech recognition, smart TV and storage medium.

BACKGROUND

With the development of society and the progress of technology, users are tired of the traditional switching mode of TV. Therefore, we propose the all intelligent AI standby function for smart TV switching to meet the higher requirements of users for the convenient operation of TV. The current technology can realize fast standby and SRT standby of smart TV, and also meet the basic experience requirements of fast standby operation of TV.

But with the update of AI smart home and the arrival of the speech era, users' requirements for the convenience of smart homes are also constantly improving. The limitations and shortcomings of traditional standby and STR fast standby are increasingly obvious when meeting the user's experience and functional requirements. The current technology is lack of other operations after TV standby, such as playing music or speech TV awakening. The traditional standby switch process takes a long time, and the switch mode is single, does not support speech awakening or video awakening, can not meet the user's intention to operate in the first time; In addition, the CPU processing rate is low during the startup process, causing problems such as slow system startup and startup lag of upper-layer applications.

Therefore, the current technology needs to be improved and developed.

SUMMARY

According to the defects in the prior art described above, the purpose of the present disclosure is providing a TV awakening method based on speech recognition, smart TV and storage medium, in order to set the standby state of the smart TV to the state of screen being off without powering off, which can receive and recognize the user's speech in real time to wake up and control the smart TV, and implement the efficient application of speech recognition, realizing a true smart switch to meet the diverse needs of users.

To achieve the above mentioned goals, the technical solution of the present disclosure to solve the technical problems is as follows:

A TV awakening method based on speech recognition, the TV awakening method based on speech recognition includes steps:

controlling, through a screen adjustment, a smart TV in a standby state of screen being off without powering off when the smart TV enters the standby state;

receiving a speech from a user in real time when the smart TV is in the standby state of screen being off without powering off, and performing a speech recognition before controlling the screen to be on directly;

recognizing the speech from the user in real time at a same time the screen is on, and calling a bottom interface to perform a corresponding functional operation according to a command expressed by the speech.

In the TV awakening method based on speech recognition, the controlling, through a screen adjustment, a smart TV in a standby state of screen being off without powering off when the smart TV enters the standby state further includes:

achieving, through a plugin layer, an interaction between an Android upper layer and a bottom hardware when the smart TV enters the standby state, to control the smart TV to perform the standby state of screen being off without powering off;

receiving, by a receiver of the smart TV, an instruction from the Android upper layer at real time after the smart TV enters the standby state of screen being off without powering off.

In the TV awakening method based on speech recognition, the screen adjustment achieves the interaction between the Android upper layer and the bottom hardware through the plugin layer, and controls the smart TV to perform and be in the standby state of screen being off without powering off.

In the TV awakening method based on speech recognition, further includes: receiving the instruction from the Android upper layer at real time after the smart TV enters the standby state of screen being off without powering off.

In the TV awakening method based on speech recognition, the screen adjustment includes:

obtaining an interface of the plugin layer according to an application layer, determining whether to be in the standby state of screen being off without powering off according to a system configuration parameter;

entering the standby state of screen being off without powering off when the interface of the plugin layer supports the standby state of screen being off without powering off, and a value of the system configuration parameter meets a requirement.

realizing the standby state of screen being off without powering off by terminating a specified program, shutting down a player and calling a bottom closing screen interface if the standby state is supported;

entering the standby state with powering off directly if the standby mode is not supported.

In the TV awakening method based on speech recognition, the on and off of the screen of the smart TV is controlled by the bottom closing screen interface.

In the TV awakening method based on speech recognition, the receiving a speech from a user in real time when the smart TV is in the standby state of screen being off without powering off, and performing a speech recognition before controlling the screen to be on directly, includes:

controlling each hardware and program to be in a normal operation state when the smart TV is in the standby state of screen being off without powering off;

receiving the speech from the user in real time and performing a speech recognition processing, then changing the screen from being in the standby state of screen being off without powering off to be in an on state when the speech is recognized as a command to light up the screen.

In the TV awakening method based on speech recognition, the speech recognition processing includes:
  transforming an unknown speech received by the smart TV into an electric signal by a microphone and then loading the electric signal on an input end of a recognition system;
  establishing a speech model according to a characteristic of the user's speech after preprocessing, and analyzing an input speech signal and extracting a required feature, on which a speech template required for the speech recognition is established.
  comparing the speech template stored with the feature of the input speech signal by the smart TV according to the speech model during the recognition;
  obtaining a speech template that best matches the input speech, and providing a speech recognition result by looking up a table according to a definition of the speech template.

In the TV awakening method based on speech recognition, the recognizing the speech from the user in real time at a same time the screen is on, and calling a bottom interface to perform a corresponding functional operation according to a command expressed by the speech includes:
  receiving the speech from the user in real time at a same time the screen of the smart TV is on, and performing the speech recognition processing to obtain the speech recognition result;
  calling the bottom interface to perform a corresponding function operation according to the speech recognition result, and monitoring the speech from the user in real time when the smart TV is playing.

In the TV awakening method based on speech recognition, further includes waking up and turning on the smart TV through a speech function after the smart TV enters the standby state of screen being off without powering off, or directly playing a desired video or music under speech instruction.

In the TV awakening method based on speech recognition, further includes operating the smart TV which is awakened by the speech or a remote controller under the instruction during a boot process of the smart TC, performing a turning on screen and exiting activity of an stack uppermost layer on a calling of the bottom interface if there are no operations other than the boot process.

In the TV awakening method based on speech recognition, the TV awakening method based on speech recognition further includes:
  receiving a command to terminate a specified process, entering a package name of the specified process to terminate the specified process, disabling a scheduled shutdown option, and turning off the screen.

In the TV awakening method based on speech recognition, the specified process is a non-system process.

A smart TV which comprises: a memory, a processor and a TV awakening program based on speech recognition stored on the memory and run on the processor, the TV awakening program based on speech recognition is executed by the processor to realize the steps of the TV awakening method based on speech recognition mentioned above.

A storage medium in which a TV awakening program based on speech recognition is stored, and the TV awakening program based on speech recognition is executed by a processor to realize the steps of the TV awakening method based on speech recognition described above.

The disclosure relates to a TV awakening method based on speech recognition, a smart TV and a storage medium. The method comprises: When the smart TV enters the standby state, control the standby state of smart TV through screen adjustment to the standby state of screen being off without powering off; When the smart TV is in the standby state of screen being off without powering off, receive the user's speech in real time and speech recognition control the screen to light directly; When the screen is lit, recognize the user's speech in real time and call the bottom interface to perform the corresponding functional operations according to the commands expressed by the speech. In the present disclosure, by setting the standby state of the smart TV to the standby state of screen being off without powering off, the user's speech can be received and recognized in real time to wake up and control the smart TV, and speech recognition has been efficiently applied, realizing a true smart switch machine, meeting the diverse needs of users.

DETAILED DESCRIPTION OF THE EMBODIMENTS

In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

In order to make the technical terms and relevant English expressions in the present disclosure clearer, the relevant explanations and instructions as follows:
  Plugin layer: Middleware for software and hardware interaction (Plug-in);
  Android upper layer: Software function logic that interacts with the user;
  Bottom hardware: Comprising speech equipment, driver equipment, hardware equipment, circuit board, screen, etc.;
  Bottom: Digital algorithm logic attached to the hardware;
  Bottom interface: Communication tools for interacting with the middleware plugin layer;
  Receiver: Communication tool between remote control and TV;

Application layer: The APP layer, the software that interacts with the user;

Rild: the bridge between Android system and baseband chip;

Vendor RIL: Rild and Rilj, the former belongs to the C layer, the latter belongs to the Java layer (actually Rild for short);

Framework layer: Framework can be simply understood as a repository for some APIS. Android developers will implement some basic functions and provide the upper layer with calls through the interface.

Bottom closing screen interface: The bridge between Android's bottom layer and the screen hardware;

IsSupportAiStandby: Whether it supports the standby state function of turning off the screen without powering off;

Generalconfig: System configuration;

killProcess: Kill (terminate) a specified process;

QuitPlayer: Turn off the player;

WakeLockActivity: A screen closing interface for app startup;

LauncherService: A service item to boot;

SystemService: System service;

STANDBUY_TV_STYLE: a parameter;

Embodiment 1

Figure 1:
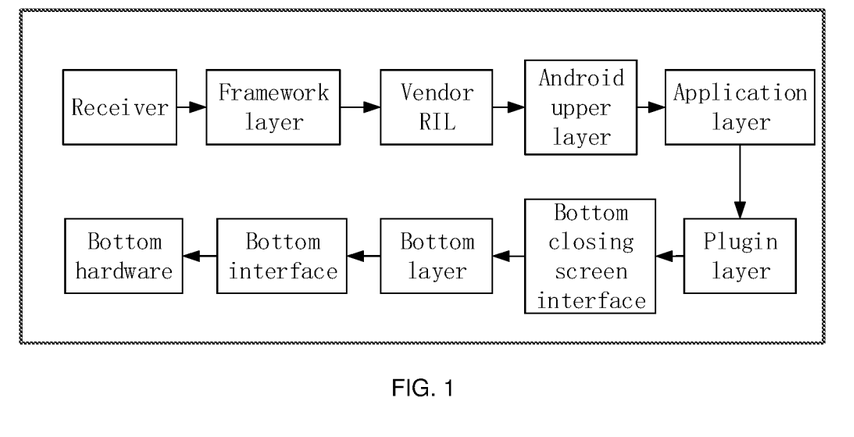
FIG. 1 illustrates a schematic diagram of the connection control relationship between the components when the screen is turned off (standby state of screen being off without powering off) on a preferred embodiment of the TV awakening method based on speech recognition in the present disclosure.

Based on the introduction of the above components, shown as FIG. 1, which illustrates a schematic diagram of the connection control relationship between the components when the screen is turned off (standby state of screen being off without powering off) on a preferred embodiment of the TV awakening method based on speech recognition in the present disclosure.

Figure 2:
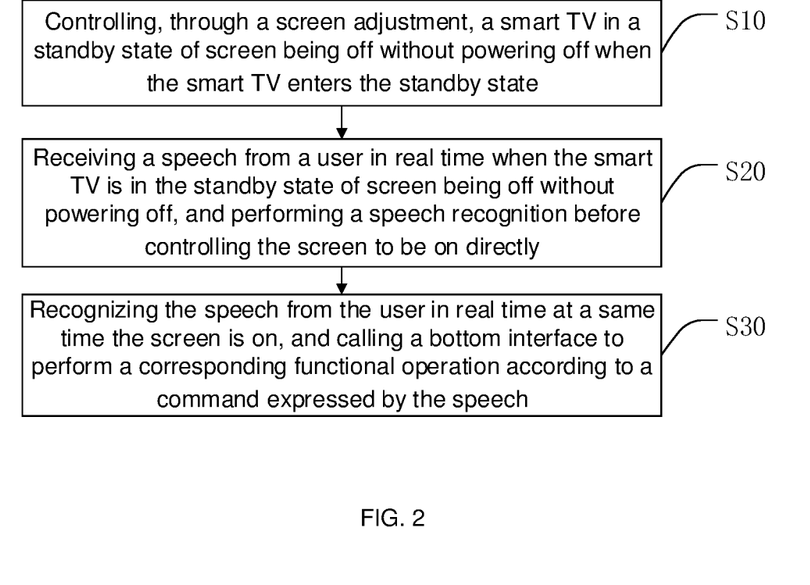
FIG. 2 illustrates a flowchart on a preferred embodiment of the TV awakening method based on speech recognition in the present disclosure.

Specifically, the preferred embodiment of the TV awakening method based on speech recognition in the present disclosure, shown as FIG. 2, comprising the following steps:

Step S10, controlling, through a screen adjustment, a smart TV in a standby state of screen being off without powering off when the smart TV enters the standby state.

Figure 3:
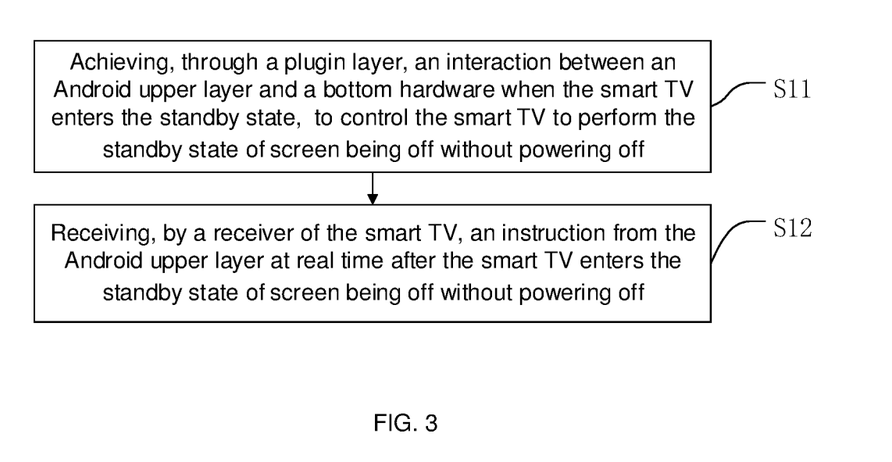
FIG. 3 illustrates a flowchart of step S10 on a preferred embodiment of the TV awakening method based on speech recognition in the present disclosure.

The specific process is shown as FIG. 3, which illustrates a flowchart of step S10 on a preferred embodiment of the TV awakening method based on speech recognition in the present disclosure.

Shown as FIG. 3, the step S10 comprising:

S11, achieving, through a plugin layer, an interaction between an Android upper layer and a bottom hardware when the smart TV enters the standby state, to control the smart TV to perform the standby state of screen being off without powering off;

S12, receiving, by a receiver of the smart TV, an instruction from the Android upper layer at real time after the smart TV enters the standby state of screen being off without powering off.

First of all, The intelligent adjustment of the screen in the present disclosure is contrary to the existing logic and design mainly comprising: In the standby state, it also needs to respond to user operations, which can not be achieved on the basis of the existing power off standby. And the coupling of standby and advertising logic must perform advertising video playback when turning on and off the machine. Previously, the hardware was turned on to trigger the startup of advertising, now the entire system is still running, thus it requires the smart use of the Android life cycle and the expansion of the broadcasting mechanism. Interaction with all apps during the standby process.

Specifically, the screen adjustment is according to the application layer to get the interface of the plugin layer: IsSupportAiStandby. The value of isSupportAiStandby is obtained through IPC communication from the middleware (the middleware manually configuring the value through various models), and according to the system configuration (GeneralConfig) parameters (can be obtained directly) to determine whether to go on standby state of screen being off without powering off. Assume that isSupportAiStandby and the system configuration parameter are considered as two separate parameters, when both parameters are supported, may be going on standby state of screen being off without powering off.

In other words, when the interface of plugin layer supports the standby state of screen being off without powering off, and when the size of the system configuration parameters meets the requirements, it will be judged to enter the standby state of screen being off without powering off. If the standby mode is supported, the standby state of screen being off without powering off is realized by terminating the specified program, shutting down the player and calling the bottom closing screen interface. If the standby mode is not supported, directly enter the powering off standby mode. (i.e. deep standby, also known as the traditional powering off standby mode).

Screen adjustment is mainly through the plugin layer to achieve the interaction between the Android upper layer and the bottom hardware, in order to control the smart TV to perform the standby state of screen being off without powering off, so as to achieve standby state of screen being off without powering off, it seems that the receiver into the standby, hardware is ready to receive the instructions from the Android upper layer. The theory is that Android's RIL layer is located between the application framework and the kernel and is divided into two parts: Rild (is the bridge between the Android system and baseband chip communication) and Vendor RIL (divided into Rild and Rilj, the former belongs to the C layer, the latter belongs to the Java layer), both of which interact with the framework layer to send hardware to screen being off without powering off instructions.

Further, the opening and closing of the screen of the smart TV is finally controlled by the bottom closing screen interface; On this basis, all key values except standby and speech keys are blocked, thus may continue to operate the TV by speech even in standby. During the startup process, the plugin interface is called to open the screen, exit the wakeLockActivity (a closed screen interface when the app starts) locked at the top of the stack, and the registration event in the advertising APK is used to determine whether the startup video needs to be played. Finally, according to the launcherService (a service item to boot) to determine whether to start TV or the homepage (there is a setting to determine whether to start TV or start the homepage. This is stored by temporarily storing the value SharedPreferences. This value will be retrieved when booting to determine whether to start the homepage or TV).

Step S20, receiving a speech from a user in real time when the smart TV is in the standby state of screen being off without powering off, and performing a speech recognition before controlling the screen to be on directly.

Figure 4:
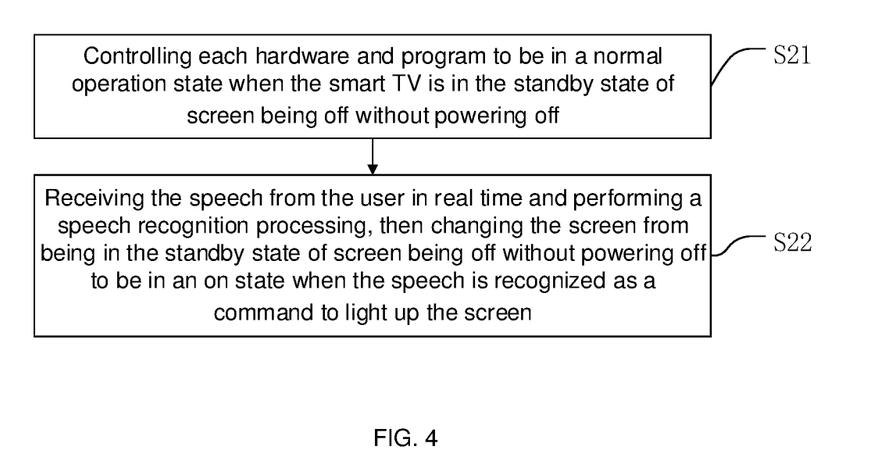
FIG. 4 illustrates a flowchart of step S20 on a preferred embodiment of the TV awakening method based on speech recognition in the present disclosure.

The specific process is shown as FIG. 4, which illustrates a flowchart of step S20 on a preferred embodiment of the TV awakening method based on speech recognition in the present disclosure;

Shown as FIG. 4, the step S20 comprises:

S21, controlling each hardware and program to be in a normal operation state when the smart TV is in the standby state of screen being off without powering off;

S22, receiving the speech from the user in real time and performing a speech recognition processing, then changing the screen from being in the standby state of screen being off without powering off to be in an on state when the speech is recognized as a command to light up the screen.

Specifically, speech recognition system is essentially a pattern recognition system, comprising feature extraction, pattern matching, reference pattern base three basic units. In the present disclosure, the speech recognition process comprising: the unknown speech received by the smart TV is transformed into an electric signal by the microphone and loaded on the input end of the recognition system; after preprocessing, the speech model is established according to the user's speech characteristics, and analyze the input speech signal and extract the required features, on this basis, the speech template required for speech recognition is established; during the recognition process, the smart TV compares the stored speech template with the characteristics of the input speech signal according to the speech model; obtain the speech template that best matches the input speech, and then according to the definition of the speech template, give the speech recognition result by looking up the table.

Whether traditional TV or smart TV now, the problem may be the same, "how to make content easy for users to access". Here are two key points: "Convenience" and "Content". In terms of convenience, traditional TV is similar to Internet TV, which is based on remote control for human-computer interaction. It goes without saying that "content" is the biggest difference between traditional TV and Internet TV. The rapid development of artificial intelligence technology has greatly improved the user experience on these two key points. Just like the standby state of screen being off without powering off, achieve obvious results both in "Convenience" and "Content", and the scheme is mainly used in AI technology in speech recognition and natural language processing.

In combination with speech recognition is Natural Language Processing (NLP), which is simply the science of allowing computers to understand, analyze, and generate natural language. Develop a model that can represent the language competence—propose various methods to improve the ability of the language model—design various application systems according to the language model—constantly improve the language model. It is possible to use natural language to directly control TV content acquisition because artificial intelligence technology in natural language processing (NLP) has achieved 90% intent recognition. The emphasis here is on "natural language". Languages like "Give me some variety shows as good as Happy Camp" are natural language, not machine language such as the traditional and often used "volume increase by 20%." Understanding and feedback on natural language is one of the key indicators of artificial intelligence in a TV set.

Step S30, recognizing the speech from the user in real time at a same time the screen is on, and calling a bottom interface to perform a corresponding functional operation according to a command expressed by the speech.

Figure 5:
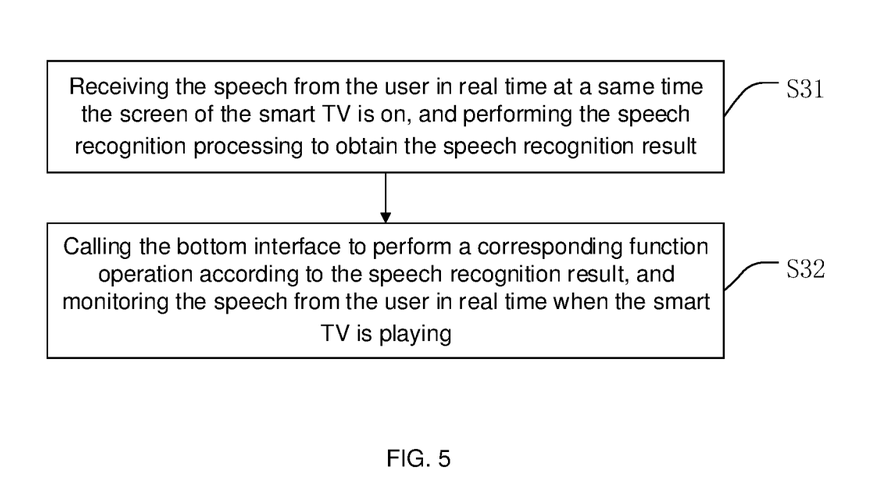
FIG. 5 illustrates a flowchart of step S30 on a preferred embodiment of the TV awakening method based on speech recognition in the present disclosure.

The specific process is shown as FIG. 5, which illustrates a flowchart of step S30 on a preferred embodiment of the TV awakening method based on speech recognition in the present disclosure.

Shown as FIG. 5, the step S30 comprising:

S31, receiving the speech from the user in real time at a same time the screen of the smart TV is on, and performing the speech recognition processing to obtain the speech recognition result;

S32, calling the bottom interface to perform a corresponding function operation according to the speech recognition result, and monitoring the speech from the user in real time when the smart TV is playing.

Specifically, the intelligent standby mode proposed in the present disclosure is mainly used in the TV system (such as the coocaa TV system), the specific implementation process is as follows:

Applied to the SystemService (system service) apk on the TV, the main function of this application is to handle the system application that maintains the entire TV system.

In the standby process, the traditional standby mode is the deep standby mode realized by sending and receiving key values or virtual key values and calling the bottom interface. No operation can be performed in the standby state again, and only the standby button can be re-awakened to work.

And now on this basis to optimize and add a new standby mode, first write "STANDBUY_TV_STYLE" parameter (a parameter) in the configuration of the machine, used to judge which kind of standby mode of the machine, and will execute the corresponding standby mode when the user performs standby operation. The deep standby has no other operations except standby service, When the standby state of screen being off without powering off has a series of judgments for intelligent processing, for example, according to the actual situation to decide whether to kill (end) the specified process, and then stop the sleep time and start the shady screen. It should be noted that the development process refers to a third-party application, for example, some non-system process such as QQ music, stop sleep time is a timer shutdown option in the settings, and you can set the time to turn off the machine. When in standby state of screen being off without powering off, it is necessary to turn off the timer switch off, and then the black screen start is the off screen operation. Finally, the bottom closing screen interface is called and a broadcast is sent into the standby state of screen being off without powering off to inform each component of the response operation.

At this time, the screen is turned off, that is, it enters the standby state of screen being off without power off. And the user can perform many operations, such as the speech function (far-field speech) in AI can wake up the TV, turn it on, or directly use speech instructions to play the desired video or listen to music, in which it will still determine whether the screen needs to be turned on, and it will also be based on whether to enter the night scene mode late at night.

In the boot process, it will operate according to the instructions after the TV is awakened by the speech or the remote control. If it is only started, open the screen for calls to the bottom interface to exit the activity at the top of the stack, and then determine whether to support advertising business, play advertising and other operations.

In the present disclosure, the AI intelligent is applied efficiently, and the intelligent switch in real sense is realized. At the same time, the corresponding operation can be carried out according to the actual situation; An expansion mode is provided for the standby mode of TV equipment; It can be used in standby screen quenching and on-off screen quenching, and can also provide intelligent enjoyment. It has strong practicability and convenience; It meets the needs of users and developers for fast and intelligent standby, which is more convenient and intelligent. At the same time, on this basis, it can maximize the application of AI intelligence and TV equipment in the later period to meet more needs of users.

Embodiment 2

Figure 6:
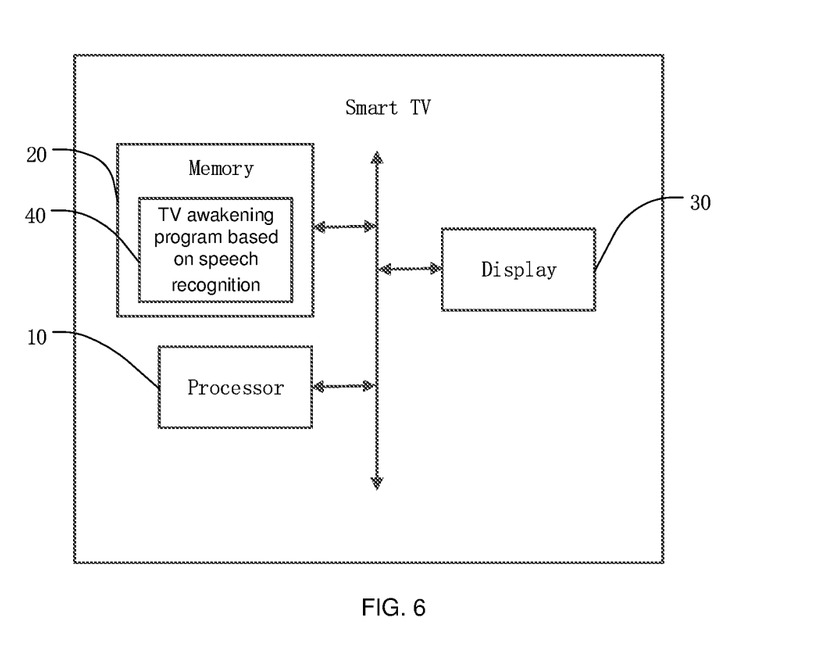
FIG. 6 illustrates a schematic diagram of the operating environment on a preferred embodiment of the smart TV in the present disclosure.

Further, shown as FIG. 6, based on the above speech recognition-based TV awakening method, the present disclosure also provides a corresponding smart TV, which comprises a processor 10, a memory 20 and a display 30. FIG. 6 shows only some of the components of a smart TV, but it should be understood that implementation of all displayed components is not required and that more or fewer components can be implemented instead.

The memory 20 may be the internal storage unit of the smart TV in some embodiments, such as the hard disk or memory of the smart TV. The memory 20 in other embodiments may also be an external storage device for the smart TV, such as a plug-in hard disk, a Smart Media Card (SMC), a Secure Digital (SD) Card, Flash Card, etc. Further, the memory 20 may also include both an internal storage unit and an external storage device for the smart TV. The memory 20 is used to store the application software installed on the smart TV and various kinds of data, such as the program code for installing the smart TV, etc. The memory 20 can also be used temporarily to store data that has been or will be output. In one embodiment, a TV awakening program 40 based on speech recognition is stored on memory 20, and the TV awakening program 40 based on speech recognition can be executed by processor 10, thus realizing the TV awakening method based on speech recognition in the present disclosure.

The processor 10 may in some embodiments be a Central Processing Unit (CPU), microprocessor or other data processing chip for running program code stored in the memory 20 or processing data, such as performing TV awakening method based on speech recognition, etc.

The display 30 in some embodiments can be LED display, liquid crystal display, touch type liquid crystal display and OLED (Organic Light-emitting Diode) toucher, etc. The display 30 is used for displaying information on the smart TV and a user interface for displaying visualizations. The components 10-30 of the smart TV communicate with each other through the system bus.

In one embodiment, the following steps are implemented when processor 10 executes the TV awakening program based on speech recognition 40 of memory 20:

controlling, through a screen adjustment, a smart TV in a standby state of screen being off without powering off when the smart TV enters the standby state;

receiving a speech from a user in real time when the smart TV is in the standby state of screen being off without powering off, and performing a speech recognition before controlling the screen to be on directly;

recognizing the speech from the user in real time at a same time the screen is on, and calling a bottom interface to perform a corresponding functional operation according to a command expressed by the speech.

The controlling, through a screen adjustment, a smart TV in a standby state of screen being off without powering off when the smart TV enters the standby state further comprises:

achieving, through a plugin layer, an interaction between an Android upper layer and a bottom hardware when the smart TV enters the standby state, to control the smart TV to perform the standby state of screen being off without powering off;

receiving, by a receiver of the smart TV, an instruction from the Android upper layer at real time after the smart TV enters the standby state of screen being off without powering off.

The screen adjustment achieves the interaction between the Android upper layer and the bottom hardware through the plugin layer, and controls the smart TV to perform and be in the standby state of screen being off without powering off.

Receiving the instruction from the Android upper layer at real time after the smart TV enters the standby state of screen being off without powering off.

The screen adjustment obtains an interface of the plugin layer according to an application layer, determines whether to be in the standby state of screen being off without powering off according to a system configuration parameter. If it is to be in the standby state, the standby state is achieved by calling a bottom closing screen interface. If it is not to be in the standby state, enters the standby state with powering off directly.

The screen extinction and lighting of the smart TV are controlled through the Android underlying interface;

The screen of the smart TV is extinguished by communication between the framework layer and the hardware;

The lighting of the smart TV screen is completed by calling the plugin interface.

The receiving a speech from a user in real time when the smart TV is in the standby state of screen being off without powering off, and performing a speech recognition before controlling the screen to be on directly, comprises:

controlling each hardware and program to be in a normal operation state when the smart TV is in the standby state of screen being off without powering off;

receiving the speech from the user in real time and performing a speech recognition processing, then changing the screen from being in the standby state of screen being off without powering off to be in an on state when the speech is recognized as a command to light up the screen.

The speech recognition processing comprises:

transforming an unknown speech received by the smart TV into an electric signal by a microphone and then loading the electric signal on an input end of a recognition system;

establishing a speech model according to a characteristic of the user's speech after preprocessing, and analyzing an input speech signal and extracting a required feature, on which a speech template required for the speech recognition is established.

comparing the speech template stored with the feature of the input speech signal by the smart TV according to the speech model during the recognition;

obtaining a speech template that best matches the input speech, and providing a speech recognition result by looking up a table according to a definition of the speech template.

The recognizing the speech from the user in real time at a same time the screen is on, and calling a bottom interface to perform a corresponding functional operation according to a command expressed by the speech comprises:

receiving the speech from the user in real time at a same time the screen of the smart TV is on, and performing the speech recognition processing to obtain the speech recognition result;

calling the bottom interface to perform a corresponding function operation according to the speech recognition result, and monitoring the speech from the user in real time when the smart TV is playing.

The TV awakening method based on speech recognition, further comprises waking up and turning on the smart TV through a speech function after the smart TV enters the standby state of screen being off without powering off, or directly playing a desired video or music under speech instruction.

The TV awakening method based on speech recognition, further comprises operating the smart TV which is awakened by the speech or a remote controller under the instruction during a boot process of the smart TC, performing a turning on screen and exiting activity of an stack uppermost layer on a calling of the bottom interface if there are no operations other than the boot process.

The TV awakening method based on speech recognition further comprises:

receiving a command to terminate a specified process, entering a package name of the specified process to terminate the specified process, disabling a scheduled shutdown option, and turning off the screen.

Embodiment 3

The present disclosure also provides a storage medium in which the storage medium stores a TV awakening program based on speech recognition, and the TV awakening program based on speech recognition is executed by the processor to realize the steps of the TV awakening method based on speech recognition described above.

In summary, the present disclosure provides a TV awakening method based on speech recognition, a smart TV and a storage medium. The method comprises: When the smart TV enters the standby state, control the standby state of smart TV through screen adjustment to the standby state of screen being off without powering off; When the smart TV is in the standby state of screen being off without powering off, receive the user's speech in real time and speech recognition control the screen to light directly; When the screen is lit, recognize the user's speech in real time and call the bottom interface to perform the corresponding functional operations according to the commands expressed by the speech. In the present disclosure, by setting the standby state of the smart TV to the standby state of screen being off without powering off, the user's speech can be received and recognized in real time to wake up and control the smart TV, and speech recognition has been efficiently applied, realizing a true smart switch machine, meeting the diverse needs of users.

Of course, ordinary technicians in this field can understand that all or part of the process in implementing the above implementation method can be completed by computer programs to instruct the relevant hardware (such as processors, controllers, etc.), the program can be stored in a computer readable storage medium, and the program can include the process of implementing the above methods at the time of execution. The storage medium can be memory, disk, disc, etc.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

INDUSTRIAL APPLICABILITY

The embodiment in the present disclosure provides a TV awakening method based on speech recognition, smart TV and storage medium, by setting the standby state of the smart TV to the standby state of screen being off without powering off, the user's speech can be received and recognized in real time to wake up and control the smart TV, and speech recognition has been efficiently applied, realizing a true smart switch machine, meeting the diverse needs of users.

What is claimed is:

1. A TV awakening method based on speech recognition, comprising:

controlling, through a screen adjustment, a smart TV in a standby state of screen being off without powering off when the smart TV enters the standby state;

receiving speech from a user in real time when the smart TV is in the standby state of screen being off without powering off, and performing a speech recognition before controlling the screen to be on directly; and recognizing the speech from the user in real time at a same time the screen is on, calling a bottom interface to perform a corresponding functional operation according to a command expressed by the speech;

wherein the controlling step further comprises:

achieving, through a plugin layer, an interaction between an Android upper layer and a bottom hardware when the smart TV enters the standby state, to control the smart TV to perform the standby state of screen being off without powering off; and receiving, by a receiver of the smart TV, an instruction from the Android upper layer at real time after the smart TV enters the standby state of screen being off without powering off;

and wherein the screen adjustment comprises:

obtaining an interface of the plugin layer according to an application layer, and determining whether to be in the standby state of screen being off without powering off according to a system configuration parameter; and entering the standby state of screen being off without powering off when the interface of the plugin layer supports the standby state of screen being off without powering off, and a value of the system configuration parameter meets a requirement.

2. The TV awakening method based on speech recognition according to claim 1, wherein the screen adjustment achieves the interaction between the Android upper layer and the bottom hardware through the plugin layer, and controls the smart TV to perform and be in the standby state of screen being off without powering off.

3. The TV awakening method based on speech recognition according to claim 1, further comprising: receiving the instruction from the Android upper layer at real time after the smart TV enters the standby state of screen being off without powering off.

4. The TV awakening method based on speech recognition according to claim 2, wherein the screen adjustment further comprises:

realizing the standby state of screen being off without powering off by terminating a specified program, shutting down a player and calling a bottom closing screen interface if the standby state is supported;

entering the standby state with powering off directly if the standby mode is not supported.

5. The TV awakening method based on speech recognition according to claim 4, wherein an on and off of the screen of the smart TV is controlled by the bottom closing screen interface.

6. The TV awakening method based on speech recognition according to claim 1, wherein the receiving of speech from a user in real time when the smart TV is in the standby state of screen being off without powering off, and performing speech recognition before controlling the screen to be on directly, comprise:

controlling each hardware and program to be in a normal operation state when the smart TV is in the standby state of screen being off without powering off;

receiving the speech from the user in real time and performing a speech recognition processing, then changing the screen from being in the standby state of screen being off without powering off to be in an on state when the speech is recognized as a command to light up the screen.

7. The TV awakening method based on speech recognition according to claim 6, wherein the speech recognition processing comprises:

transforming an unknown speech received by the smart TV into an electric signal by a microphone and then loading the electric signal on an input end of a recognition system;

establishing a speech model according to a characteristic of the user's speech after preprocessing, and analyzing an input speech signal and extracting a required feature, on which a speech template required for the speech recognition is established;

comparing the speech template stored with the feature of the input speech signal by the smart TV according to the speech model during the recognition;

obtaining a speech template that best matches the input speech, and providing a speech recognition result by looking up a table according to a definition of the speech template.

8. The TV awakening method based on speech recognition according to claim 7, wherein the recognizing of the speech from the user in real time at a same time the screen is on, and calling a bottom interface to perform a corresponding functional operation according to a command expressed by the speech comprise:

receiving the speech from the user in real time at a same time the screen of the smart TV is on, and performing the speech recognition processing to obtain the speech recognition result;

calling the bottom interface to perform a corresponding function operation according to the speech recognition result, and monitoring the speech from the user in real time when the smart TV is playing.

9. The TV awakening method based on speech recognition according to claim 8, further comprising: waking up and turning on the smart TV through a speech function after the smart TV enters the standby state of screen being off without powering off, or directly playing a desired video or music under speech instruction.

10. The TV awakening method based on speech recognition according to claim 9, further comprising: operating the smart TV which is awakened by the speech or a remote controller under the instruction during a boot process of the smart TC, performing a turning on screen and exiting activity of an stack uppermost layer on a calling of the bottom interface if there are no operations other than the boot process.

11. The TV awakening method based on speech recognition according to claim 8, further comprising:

receiving a command to terminate a specified process, entering a package name of the specified process to terminate the specified process, disabling a scheduled shutdown option, and turning off the screen.

12. The TV awakening method based on speech recognition according to claim 11, wherein the specified process is a non-system process.

13. A smart TV, wherein the smart TV comprises: a memory, a processor and a TV awakening program based on speech recognition stored on the memory and run on the processor, the TV awakening program based on speech recognition is executed by the processor to realize the steps of the TV awakening method based on speech recognition according to claim 1.

14. A non-transitory storage medium, wherein the non-transitory storage medium stores a TV awakening program based on speech recognition, and the TV awakening program based on speech recognition is executed by a processor to realize the steps of the TV awakening method based on speech recognition according to claim 1.

* * * * *